United States Patent
Marietti et al.

(10) Patent No.: US 6,666,983 B2
(45) Date of Patent: Dec. 23, 2003

(54) PATTERNED COATED ARTICLES AND METHODS FOR PRODUCING THE SAME

(75) Inventors: Gary J. Marietti, Cheswick, PA (US); Mehran Arbab, Allison Park, PA (US); James J. Finley, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/263,499

(22) Filed: Oct. 3, 2002

(65) Prior Publication Data

US 2003/0031842 A1 Feb. 13, 2003

Related U.S. Application Data

(62) Division of application No. 09/199,976, filed on Nov. 25, 1998, now Pat. No. 6,514,621.
(60) Provisional application No. 60/068,828, filed on Dec. 24, 1997.

(51) Int. Cl.[7] .............................................. C03C 15/00
(52) U.S. Cl. ........................... 216/75; 216/28; 216/32; 216/49; 216/76; 216/100; 216/102; 216/105; 427/376.2
(58) Field of Search ....................... 427/372.2, 376.2; 216/28, 32, 45, 49, 75, 76, 100, 102, 105, 121.69, 192.34

(56) References Cited

U.S. PATENT DOCUMENTS

| | | | | |
|---|---|---|---|---|
| 3,853,648 A | * | 12/1974 | Janus et al. ................... 156/7 |
| 4,187,340 A | * | 2/1980 | Oishi et al. .................. 428/210 |
| 4,583,822 A | | 4/1986 | Southwell ................... 350/164 |
| 4,705,356 A | | 11/1987 | Berning et al. ............. 350/166 |
| 4,716,086 A | | 12/1987 | Gillery et al. ............... 428/432 |
| 4,781,792 A | * | 11/1988 | Hogan ......................... 156/663 |
| 4,786,563 A | * | 11/1988 | Gillery et al. ............... 428/630 |
| 4,902,581 A | | 2/1990 | Criss ............................ 428/627 |
| 5,049,780 A | | 9/1991 | Dobrowolski et al. ...... 313/509 |
| 5,112,693 A | | 5/1992 | Gillery ........................ 428/432 |
| 5,189,952 A | | 3/1993 | Ohmura et al. |
| 5,417,827 A | | 5/1995 | Finley .................... 204/192.28 |
| 5,521,759 A | | 5/1996 | Dobrowolski et al. ...... 359/585 |
| 5,563,734 A | | 10/1996 | Wolfe et al. ................. 359/360 |
| 5,619,059 A | | 4/1997 | Li et al. ...................... 257/431 |
| 5,972,233 A | * | 10/1999 | Becker et al. ................. 216/28 |
| 6,214,250 B1 | * | 4/2001 | Moh et al. ..................... 216/94 |
| 6,274,244 B1 | * | 8/2001 | Finley et al. ............... 428/433 |
| 6,296,777 B1 | * | 10/2001 | Engelhardt et al. ........... 216/40 |

FOREIGN PATENT DOCUMENTS

| | | |
|---|---|---|
| CH | 339575 | 8/1959 |
| EP | 0 412 812 | 2/1991 |
| FR | 2369103 | 6/1978 |
| FR | 2451900 | 11/1980 |
| JP | 04 219347 | 8/1992 |
| JP | 06 115974 | 4/1994 |

OTHER PUBLICATIONS

International Search Report for PCT–1340A1.

* cited by examiner

*Primary Examiner*—Cathy Lam
(74) *Attorney, Agent, or Firm*—Andrew C. Siminerio

(57) ABSTRACT

The present invention is directed to an article with a patterned appearance provided by a visually observable contrast between one or more genereally transparent thin film coatings deposited over a substrate. At least one of the deposited coatings exhibits a reflected color and/or contrast and visible differing transmitted color and/or contrast or a plurality of coatings together exhibit different reflected colors and/or contrasts. The coatings are selected from the group of: metals depositable by magnetron sputtering vacuum deposition, chemical vapor deposition, pyrolytic coating, or sol-gel techniques, metal oxide coatings, metal nitride coatings, semi-conductor containing coatings, metal oxynitrides and mixtures thereof. The present invention is also directed to a method of making the articles having a visually observable patterned appearance involving masking and applying the coating or applying the coating and removing a portion of the coating to form the pattern.

12 Claims, 3 Drawing Sheets

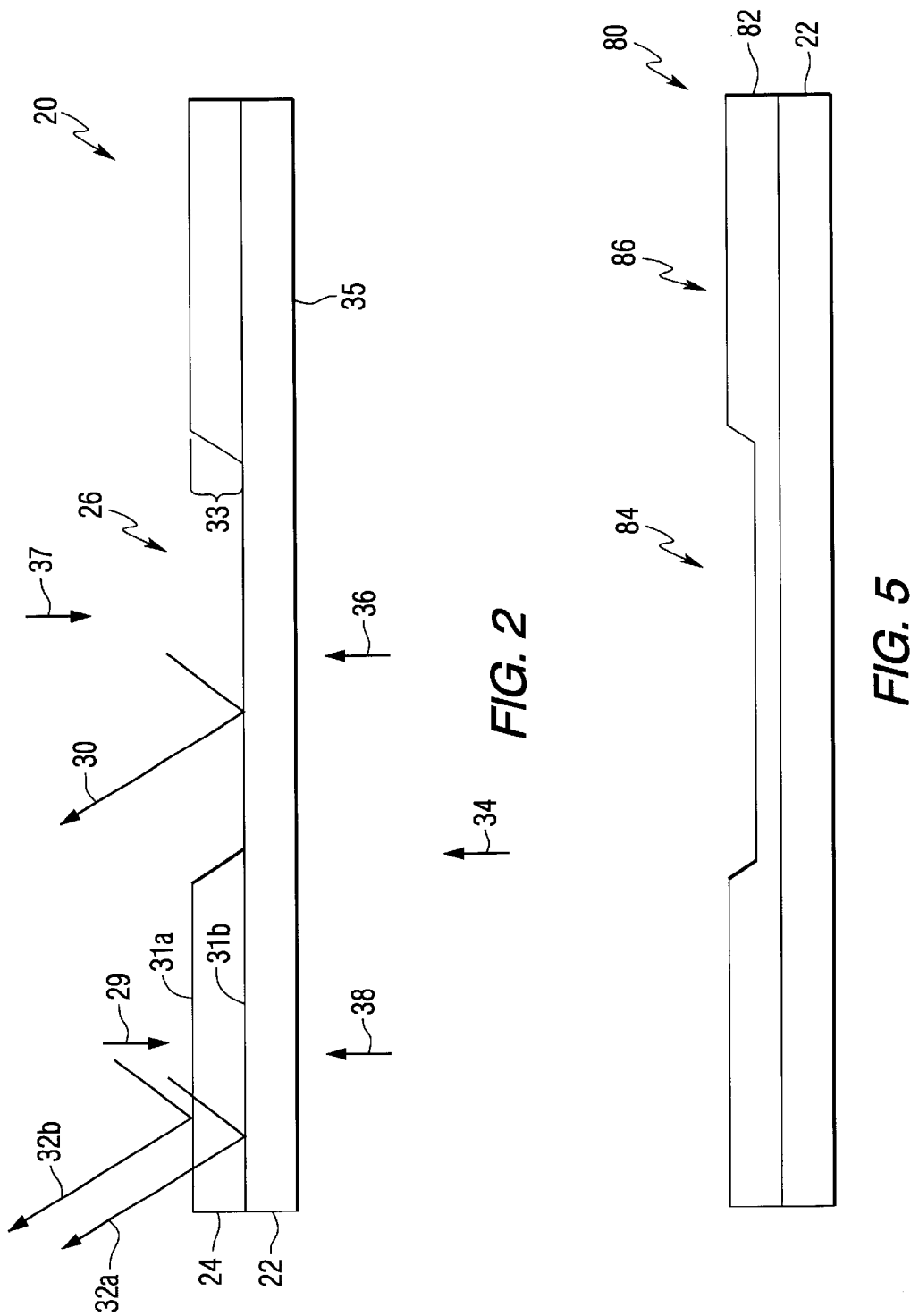

PATTERNED COATED ARTICLES AND METHODS FOR PRODUCING THE SAME

This application is a divisional of U.S. Application Ser. No. 09/199,976, filed Nov. 25, 1998, now U.S. Pat. No. 6,514,621, which claims the benefit of U.S. Provisional Application No. 60/068,828, filed Dec. 24, 1997.

FIELD OF THE INVENTION

The invention in general is directed to a transparent article having a visually observable contrast between coatings deposited over a substrate or between coatings deposited over a substrate and uncoated surfaces of the substrate, to provide a patterned surface. One of the coatings exhibits a reflected color and a differing transmitted color, at least one of which differs from the reflected color or transmitted color of the other coating(s) or the uncoated surface of the substrate. The invention is also directed to methods of making the articles.

BACKGROUND OF THE INVENTION

Coated articles, particularly glass substrates having one or more coatings deposited thereon are presently available. The coatings can be deposited by a variety of processes including magnetron sputter vacuum deposition (MSVD), chemical vapor deposition (CVD), spray pyrolysis process and the sol-gel method, among others.

It is known that certain coatings or combinations of coatings alter the interaction between electromagnetic energy, more particularly visible light energy and the substrate, e.g. alter reflected, transmitted or absorbed visible light some of which is by interference effects as noted in U.S. Pat. No. 4,902,581 (Criss). "Interference effect" involves the visually observable constructive or destructive combination of visible light waves or rays as they are transmitted through or reflected from the coatings and/or substrate. Absorption occurs in certain materials in the visible region of the light spectrum where the electromagnetic energy does not pass through the material.

The interference effect is usually visually observed as a decrease in reflected light (e.g. anti-reflective coatings), as a transmitted color and/or as a reflected color which differs from that which would have been observed in the absence of the interference effect.

Forming low reflectance, highly saturated colored coatings in monolithic glazing using coatings that exhibit color by interference effects are described in U.S. Pat. No. 5,112,693 to Gillery.

In view of the presently used technology, it would be advantageous to provide articles, as for example, for decorative or aesthetic purposes, among others, by utilizing coatings over a substrate to exhibit differential interference effects.

SUMMARY OF THE INVENTION

The present invention is directed to an article having a visually observable pattern. The pattern is provided by the contrast between at least one first and at least one other portion of a substrate, e.g. a glass, metal, or ceramic substrate. The at least one first portion has a thin film coating, e.g. which is generally transparent, exhibiting a first visually observable color or contrast when viewed under reflected light (hereinafter "reflected color") and a second visually observable color or contrast which can be that when viewed under transmitted light (hereinafter transmitted color). The at least one other portion to provide the contrast may be uncoated, coated with one or more non-colored (i.e. neutral) thin film coatings or coating layers, and/or coated with one or more thin film coatings having a reflected color and/or transmitted color, where at least one of the reflected color and/or transmitted color of the at least one other portion differs from the reflected color and/or the transmitted color of the at least one first portion. The transmitted color can be that from transmitted light through a substrate. The at least one coating for the thin film layer or otherwise referred to as the thin film coating can be chosen from metals, metal oxides metal nitrides, semi-conductor materials and mixtures and combination thereof. All of these materials should have the capability of being deposited by magnetron sputtering vacuum deposition ("MSVD"), chemical vapor deposition ("CVD"), pyrolytic coating techniques or sol-gel techniques or the like known to those skilled in the art.

The present invention is also directed to a method for providing an article having a visually patterned appearance by the following steps. First, at least one surface portion of a substrate, e.g. a glass, metal, and/or ceramic substrate, is masked. At least one coating is deposited, e.g. by MSVD, CVD, spray pyrolysis, or sol gel techniques, as a thin film over the masked and unmasked portions of one or more surfaces of the substrate. The mask along with any coating deposited on the mask is removed to expose the surface portion to provide a patterned appearance as a contrast between the deposited thin film coating and the at least one surface portion of the substrate.

The present invention is also directed to a method for providing an article having a visually patterned appearance which involve the following steps. At least one coating is provided which can exhibit a first reflected color and/or a first transmitted color at a first thin film coating thickness and either a second reflected color, a second transmitted color or both, at one or more other thickness over one or more surface portions of a substrate. The thickness of one or more thin film layers of one or more types of coatings is varied one or more times in the thin film thickness dimensions, of the coating over one or more surface portions of the substrate in a pattern form to provide a patterned appearance when the article is observed under reflected light, transmitted light, or both. As with the use of different types of thin film coatings, the patterned appearance is formed by the contrasting reflected and/or transmitted colors or contrasts.

The original surface portion of the substrate in any embodiment of the article and method of the present invention may have a coated, uncoated, roughened or textured surface. The thickness may be varied during the coating deposition step as by differentially depositing the coating over selected portions of the surface of the substrate. Alternatively, the thickness may be varied after the coating has been deposited by removing a portion of the coating in a pattern form. The coating can be applied as a thin film to the substrate and subsequently or simultaneously heated in an oxidizing or nitriding atmosphere to give the patterned appearance with one or more oxide or nitride materials. A portion of the coating may be removed by depositing the coating over a mask during the deposition step, and subsequently removing the mask and the coating deposited thereon. Alternatively, a portion of the coating may be removed or the original substrate roughened or texturized by etching or milling. Combinations of the foregoing are also contemplated as within the scope of the present invention. Also the article with the pattered appearance can be produced into a laminate with one or more non-patterned substrates or with one or more other patterned articles.

BRIEF DESCRIPTION OF THE DRAWINGS

FIG. 2 is cross-sectional view along the line II—II of FIG. 1;

FIG. 5 is a view similar to FIG. 2 of an alternative embodiment of the present invention.

DESCRIPTION OF THE PREFERRED EMBODIMENTS

Figure 1:
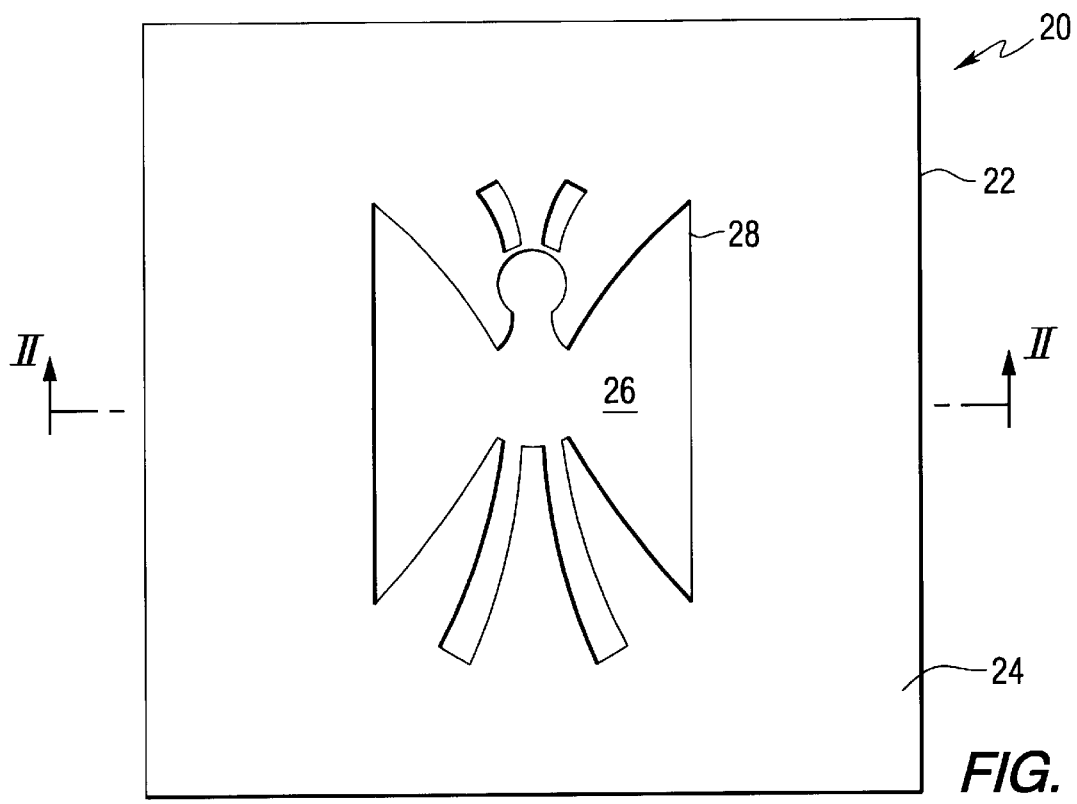
FIG. 1 is a top plan view of an article having a patterned appearance in accordance with the present invention.

The present invention is directed to an article having a patterned appearance provided by a visually observable contrast and/or color between one or more portions of a surface of the article. For example the contrast can be between portions of a thin film coating deposited over a surface of the substrate, between thin film coatings deposited over the substrate, between thin film coated and uncoated surface portions of the substrate and combinations of the foregoing. For instance one of the coatings can exhibit a reflected color and a visually observable differing transmitted color. Generally for this difference to be visually observable, the difference for the average unaided human eye is preferably from about 2 MacAdam units, more preferably about 3 MacAdam units and more preferably about 10 MacAdam units. The color and reflectance can be measured on a Spectrogard Color System spectrophotometer available from Pacific Instruments as discussed in U.S. Pat. No. 5,417,827 (Finley et al.). Another nonexclusive example of such a contrast difference is where the reflectance of the first portion is less than or equal to the reflectance of the at least one other portion of the substrate. A specific example of this would be a silver thin film coating on a glass substrate.

The present invention is also directed to methods of making the articles. The invention is described in more detail in the following discussion where like elements are indicated by like reference numerals.

Referring now to FIGS. 1 and 2 there is shown an article 20 having a visually observable patterned appearance. The article 20 includes substrate 22 having coating 24 deposited on selected first portions of the substrate surface as shown in FIG. 2. Although coating layer 24 in FIG. 2 is depicted as the top most coating layer on the substrate, additional thin film or non-thin film coating layers can be placed on top of coating layer 24. A few of these are the solar control coating layers, coloring or tinting coating layers, and self-cleaning pyrolytic coating layers as known to those skilled in the art. More particularly, and as shown in FIG. 2, an other portion 26 of the substrate 22 is uncoated to provide pattern form 28. The pattern form 28 more clearly illustrated in FIG. 1 is in the form a butterfly however, the present invention is not so limited, and the pattern form 28 may be any pattern form including but not limited to graphic representations, text, decorative images, or a plurality of images or combinations thereof. Generally as used herein, the term 'pattern' refers to a design for a coating layer on the surface of a substrate or the surface of a coating on a substrate. 'Patterning' is the process of creating the selected design or appearance form upon a surface resulting in formation of a 'patterned' surface. The visually observable pattern results from the visible contrast between the uncoated surface portion 26 of the substrate 22 and the coated surface portion of the substrate 24.

With reference to FIG. 2, when rays of diffused white light from white light source (not shown) are directed toward the substrate 24 as illustrated by arrow 29, the rays impinge the surface of the article at a plurality of angles of incidence. A portion of the rays are reflected from the surface. A portion of the rays are transmitted through the surface. Still yet, another portion is absorbed or trapped within the article and may give rise to internal or secondary transmission, reflection and or absorption. While it is appreciated these secondary reflections, transmissions and/or absorptions may have an affect on the primary reflectances and transmissions, the following discussion is directed to the primary, as opposed to secondarily reflected and transmitted visible light, which forms the major component of the observed reflected and transmitted visible light from and through the substrate. Also, while it is recognized that a plurality of rays will be simultaneously reflected or transmitted, for the sake of simplicity in the discussion that follows the reflectance or transmission of one or at most two representative rays will be discussed to explain the present invention.

Referring then to FIG. 2, the reflected rays from the uncoated portion 26 of the article 20 are illustrated by the arrow 30. The reflected rays of light will appear neutral in color when observed along the direction illustrated by arrow 29. In contrast, when that same while light is reflected from surfaces 31a and 31b of coating 24 as a thin film layer along the direction illustrated by arrows 32a and 32b respectively, the constructive and destructive interference exerted by the coating 24 on the reflected light waves will cause the reflected light to appear to have a tint or color (e.g. a reflected color) when observed along the direction illustrated by arrow 29.

When the white light source (not shown) is placed on the opposite side of substrate 22 and its light rays are directed toward the article 20, the rays will also impinge the article 20 from a plurality of angles of incidence. Similarly, as discussed above, a portion of the visible light rays will be reflected, transmitted or absorbed as discussed above, and also, as discussed above, while secondary reflectance, absorption or transmission may occur, the discussion herein shall be directed to the primary reflected or transmitted light rays. Also as discussed above, while it is recognized that a plurality of rays will be simultaneously reflected or transmitted, for the sake of simplicity in the discussion that follows the reflectance or transmission of one or at most two representative rays will be discussed to explain the present invention.

Referring then to FIG. 2, when the white light source (not shown) is placed on the opposite side of substrate 22 and is directed toward the article 20 along the direction illustrated by arrow 34, a portion of the light rays reflect from the surface (not shown). A portion of the light rays are transmitted through the substrate 22 through the uncoated portion 26 of substrate 22 along the direction illustrated by the arrow 36, and will appear neutral in color or tint when observed along the direction illustrated by arrow 29. In contrast, when that same white light is transmitted through substrate 22 and through coating 24 along the direction illustrated by arrow 38, it will appear to have a tint or color (e.g. a transmitted color) when observed along the direction illustrated by the arrow 29 due to the interference effects exerted by coating 24 on the visible light waves as they pass through coating 24.

When diffused white light impinges on both major surfaces 33 and 35 of the article 20 along the directions illustrated by the arrows 29 and 34 respectively, the observed color when viewing the article 20 along the direction illustrated by the arrow 29 will vary with whether the reflected color reflected along the direction illustrated by the arrows 32*a* and 32*b* is observed or the transmitted color transmitted through the article 20 is observed. Thus, the article 20 appears to have a first color when viewed under reflected light, and a second color when viewed under transmitted light when diffused white light impinges both major surfaces 33 and 35 and the article 20 is viewed along the direction illustrated by the arrow 29.

In an alternative embodiment of the present invention, not shown, the uncoated surface portion 26 of the substrate 22 and that surface portion having coating 24 deposited thereon may be reversed. In this embodiment, the coating 24 would be present over the substrate 22 as the body of the pattern, e.g. the butterfly illustrated in FIG. 1 as a first portion of the substrate. In this instance the body of the pattern has a first color or tint when viewed under reflected light and a second color or tint when viewed under transmitted light. The uncoated surface portion of the substrate 22 has a neutral appearance under reflected and transmitted light as the other portion of the substrate.

Figure 3:
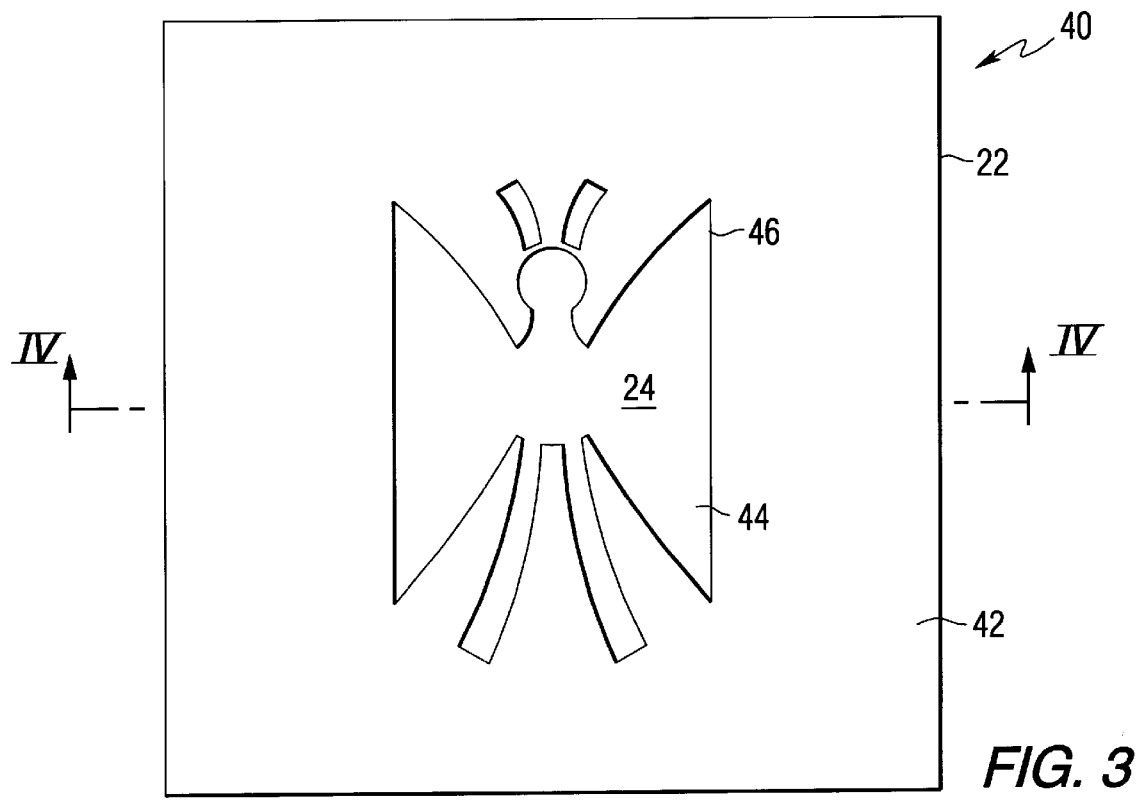
FIG. 3 is a top plan view of an alternative embodiment of the article of the present invention.
Figure 4:
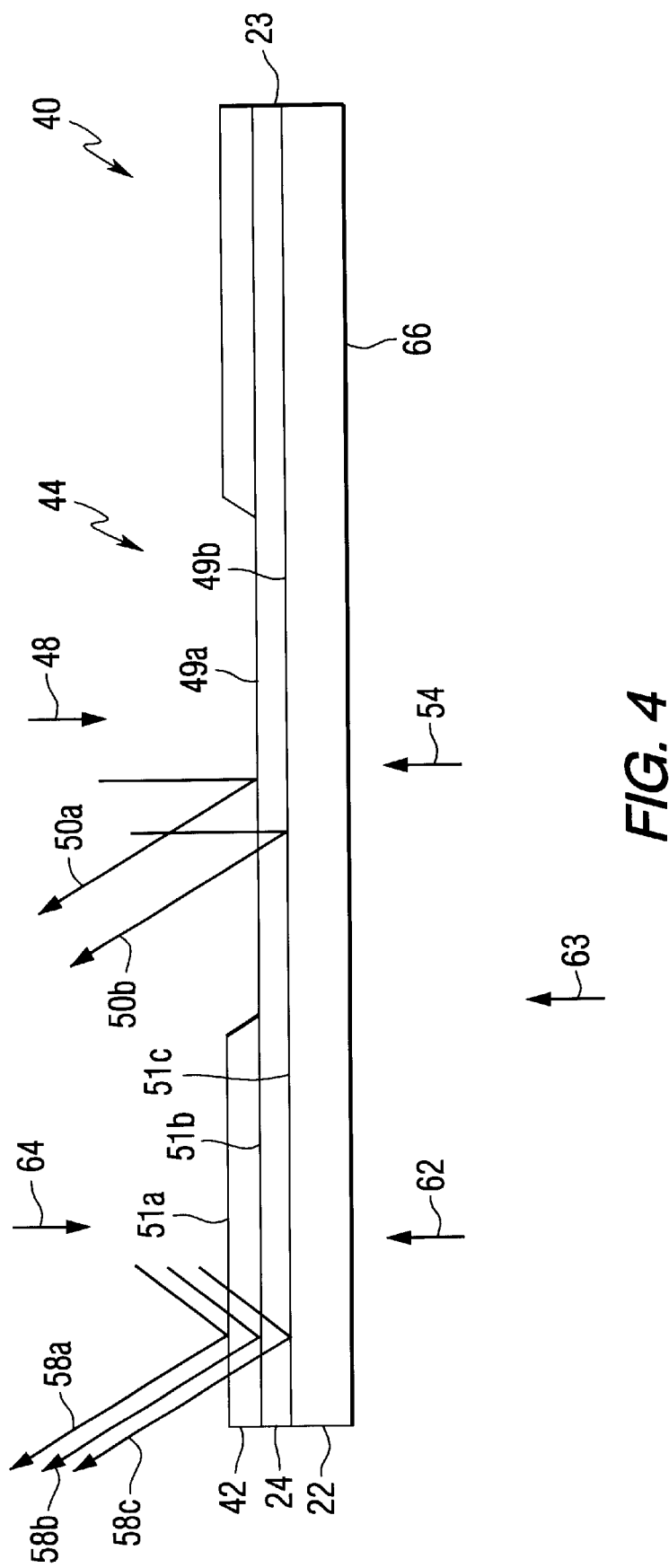
FIG. 4 is a cross sectional view along the line IV—IV of FIG. 3.

In an alternative embodiment of the present invention illustrated in FIGS. 3 and 4, article 40 is shown, and as in the prior embodiment the thickness of the one or more coating layers is in the thin film thickness range. Article 40 includes substrate 22 having at least one major surface 23 which has coating 24 thereon. A second coating 42 is deposited over selected first portions of the coating 24 as illustrated in FIGS. 3 and 4. Portion 44 of the coating 24 not overcoated with coating 42 is the body of a pattern form defined by numeral 46 as the other portion of the surface of substrate 22.

The article 40 has a visually observable patterned appearance, e.g. the butterfly pattern form, provided by the visible observed color contrast between the coating thin film layers 24 and 42. While it is only required for purposes of the present invention that one of the coatings 24 and 42 exhibit a reflected color and a differing transmitted color or second reflected color, in a preferred embodiment of the present invention both coatings 24 and 42 exhibit such an interference effect.

In this embodiment, when diffused white light is directed toward the surface of the article 40 along the direction illustrated by the arrow 48, and is reflected from the surfaces 49*a* and 49*b* of the coating 24 along the direction illustrated by arrows 50*a* and 50*b*, the constructive and destructive interference provided by the coating 24 on the reflected light waves will result in the reflected light having a reflected color when observed along the direction illustrated by arrow 48. When white light is directed toward the surface of the article 40 along the direction illustrated by the arrow 64 and is reflected from the surfaces 51*a,* 51*b* and 51*c* through both coatings 42 and 24 along the direction illustrated by the arrows 58*a,* 58*b* and 58*c,* it will also appear to have a reflected color. However, the destructive and constructive interference exerted by the combined coatings 24 and 42 will result in the reflected color differing from that of the single coating 24, resulting in differing reflected colors. Similarly, when white light is directed toward the article 40 along the direction illustrated by the arrow 63 and is transmitted through article 40 along the direction illustrated by the arrow 54, it will appear to have a transmitted color due to the interference effects exerted by coating 24 when viewed along the direction illustrated by the arrow 48. When white light directed toward the article 40 along the direction illustrated by the arrow 63 is transmitted through the article 40 along the direction illustrated by the arrow 62, it will appear to have a transmitted color when viewed along the direction illustrated by the arrow 48. However, the destructive and constructive interference exerted by the combined coatings 24 and 42 will cause the transmitted color to differ from that of the single coating thin film layer 24, resulting in differing transmitted colors. Thus the pattern of the article 40 will be observed as the contrast between the two reflected colors under reflected light and as the contrast between the two transmitted colors when viewed under transmitted light.

When white light irradiates both major surfaces of the article 40 along the directions illustrated by the arrows 48 and 63, the observed transmitted or reflected color when viewing the article 40 along the direction illustrated by the arrow 48 will vary with whether it is the reflected color or transmitted color of the single coating 24 or the combined coating layers 24 and 42 that is observed. Thus the article 40 appears to have four colors when viewed along a direction illustrated by the arrow 48 comprising a pair of differing reflected colors when viewed under reflected light, and a pair differing transmitted colors when viewed under transmitted light under these conditions. As may be appreciated, it is not necessary that all four colors differ. For example, it may be desired for the pattern to be visually observable only under reflected light. To obtain this effect, the pattern's transmitted color is matched to the transmitted color of combined coatings 24 and 42, while its reflected color remains contrasted to the reflected color of the combined coatings 24 and 42. Also as may be appreciated, this effect is not limited to reflected light, and may be reversed, for example, to provide a pattern which is not visually observable under reflected light but is visually observable under transmitted light.

As may be appreciated, the single thickness coating layer 24 over the portion 44 of the substrate 22 and the combined thickness coating layers 24 and 42 over the other portion, or in this case the remainder, of the surface of the substrate 42 may be reversed, with the combined thickness of coatings 24 and 42 deposited as thin film layers over the portion 44 of the substrate 22 along the pattern form 46 with the remainder of the surface of the substrate 22 having only the single thickness coating 24.

The color differential to bring out the pattern may be accomplished by having the coatings 24 and 42 the same or different. When the coatings 24 and of the same material, it is necessary only to provide a differential thickness between the coatings 24 and 42 in the pattern form versus outside the pattern form, which thickness differential is sufficient to produce a visually observable differing interference effect, in order to obtain a patterned appearance on the surface of the article of the present invention. This is illustrated in FIG. 5, wherein an article 80 is shown having only a single coating 82 deposited thereon. The coating 82 is provided in a pattern form similar to that illustrated in FIGS. 3 and 4, however, rather than applying two separate coatings, the coating 82 is provided as single coating with a portion 84 of a different thickness than a portion 86. The thickness differential is sufficient to provide the above described visually observable interference effects and in turn the patterned appearance on article 80.

While not shown, as may be appreciated, the present invention is not limited to articles such as articles 40 and 80 which have a single difference in thickness between portions of the differing coatings, or between portions of the same coating. The invention contemplates articles having one or more coatings, each of which may include several portions of differing thickness to provide articles having an unlimited number of colors or tints in the pattern form to provide multicolored pattern forms of great complexity.

For example, a coated article may be formed by coating a surface of a substrate, e.g. a neutral glass substrate, with a first metal oxide coating, more particularly a titanium dioxide coating to a coating layer thickness of for example, about 515 Angstroms, to provide a surface which appears silver under reflected diffuse white light. A portion of the silver-reflecting surface may be masked in a pattern form, e.g. as a butterfly silhouette, and both the masked other portion and unmasked first portion of the silver-reflecting surface may be subsequently overcoated with additional titanium dioxide coating to a total coating layer thickness of, for example, about 770 Angstroms to provide a surface which appears gold under reflected white diffuse light. Upon removal of the masked portion to reveal the silver-reflecting other portion, the article is observed under reflected light to have a silver butterfly over what is observed to be a contrasting gold background. The silver butterfly may again be masked, and a portion of the gold-reflecting surface may also be masking in the pattern of a butterfly silhouette, and both the masked portions and the unmasked portions of the surface may be again overcoated with additional titanium dioxide coating to a total coating layer thickness of, for example about 1028 Angstroms, to provide another first portion of surface which appears fuchsia under reflected diffuse white light. Upon removal of both masks, the article will appear to have a silver butterfly and a gold butterfly other portions of the surface over what is observed to be a contrasting fuchsia background under reflected diffuse white light. Similarly, the silver butterfly may again be masked, as may be the gold butterfly. A portion of the surface of the fuchsia-reflecting surface as a third first portion may also be masked in the form of a butterfly silhouette. The surface may be overcoated with still additional titanium dioxide coating to a total coating layer thickness of, for example about 1258 Angstroms to provide a third first surface which appears blue under reflected white diffuse light. Upon removal of the masks, the article will be observed to a patterned appearance which includes a silver butterfly silhouette, a gold butterfly silhouette and a fuchsia butterfly silhouette as a third other portion of the surface over what is observed to be a blue background under reflected light. This process may be repeated over portions of the substrate to provide articles having formed thereon pattern forms of great complexity and color variation and multiple designs.

Substrates compatible with the present invention include ceramic substrates and transparent substrates including rigid materials such as glass including coated glass and rigid or flexible polymeric or plastic materials such as polycarbonates and acrylates and nontransparent substrates such as opaque coated glass and metallic substrates like polished metals and the like, Further examples of glass substrates include: soda-lime silicate glass especially float prepared or manufactured glass. These substrate materials as is well known to those skilled in the art may be transparent but they also could be highly absorbing but low in visible light transmission. The substrates can also be reflective material on transparent substrates such as glass in a manner to have mirror-coated glass. The metallic substrates can range from those like stainless steel to any metal like copper, aluminum, silver, and the like or on any of the aforementioned substrates with one or more of these metals as a coating(s) on the substrate. Also the substrates can have a mirrored, roughened, textured surface to provide a contrast effect. Generally any sandblasting or etching process known in the art can produce the roughed or textured surface on the substrate.

The more rigid substrates can have a second major surface generally opposing the first major surface in a spaced apart manner to provide a thickness to the substrate. Where these types of substrates are transparent the first portion of the substrate can be on the first major surface and the other portion on the opposing major surface. This would be accomplished on an article as shown in FIGS. 3 and 4 where either the second coating 42 or coating 24 is on surface 66. Also the substrates as an alternative to or in addition to having an opaque coating on the major surface that opposes the surface with the patterned visual appearance can have any coatings known to those skilled in the art. One nonexclusive example includes low emissivity coatings known in the art. For instance in FIG. 2 such a coating would be on all, preferably, or a part of surface 35 of the substrate 22. Typical thicknesses known in the art for these types coatings as well as for the substrates can be used. With these types of coatings that reduce the transmittance of visible light through the substrate, the one or more coatings in thin film layers on the substrate that give the patterned appearance would be used to result in a second reflective color or contrast. This is opposed to the coatings used as thin film layers where the coating(s) result in a second color or contrast from transmitted visible light.

The interference effect is generally observed where the coating to produce the interference effect is either non-absorbing or intermediately absorbing of visible light or a any combination of these. Where the material is fully or highly absorbing, little or no light is reflected or transmitted to produce an observable interference effect. Therefore, coatings compatible with the present invention that provide the interference effect include thin film coatings that range from non-absorbing to those that are less than highly absorbing but include those that are intermediately absorbing of visible light. Generally transparent films of metals, metal oxides and/or metal nitrides and mixtures and combinations thereof are suitable examples of such film coatings. Such coatings include but are not limited to titanium oxides, particularly titanium dioxide, tantalum oxides, tin oxides, niobium oxide, zinc stannate, zinc oxides, zirconium oxides, germanium oxide, aluminum oxide, indium oxide, cadmium oxide, hafnium oxide, tungsten oxide, vanadium oxide, chromium oxide, molybdenum oxide, iridium oxide, nickel oxide, silicon oxide; silicon nitrides, silicon alloys known in the art, germanium nitride, nickel-chromium nitride, titanium nitrides, tantalum nitride, niobium nitride, and zirconium nitride, and any mixtures or combinations thereof and also including metal oxynitrides and alloys thereof. The semi-conducting materials in the forgoing list of materials are the silicon oxides and nitrides and the germanium oxides and nitrides. Other useful materials include: cerium oxide, $SiO_2$, $GeO_2$, $Al_2O_3$, $In_2O_3$, $CeO_2$ or the like, or a mixture thereof, e.g. $ZrO_2$—$SiO_2$ or the like, and those that can form a transparent film. The coating composition may include another component as those two component materials of the series such as: $ZnO$—$SiO_2$, $ZnO$—$Al_2O_3$, $ZnO$—$GeO_2$, $ZnO$—$ZrO_2$, $TiO_2$—$SiO_2$, $TiO_2$—$Al_2O_3$—$TiO_2$—$GeO_2$, $TiO_2$—$ZrO_2$, $CeO_2$—$SiO_2$, $CeO_2$—$Al_2O_3$, $CeO_2$—$GeO_2$, $CeO_2$—$ZrO_2$ or materials of a three or more component series. Nonexclusive examples of metal-containing coating are: chromium, chromium nickel, stainless steel, aluminum, gold, silver and alloys thereof.

By the terms "thin film", it is meant that the coating as a single layer has a thickness in the range of fractions of visible light wavelengths or that has a profiled surface of periodic structures with profile dimensions of the order of light wavelengths in order that interference colors are generated by the coating or coatings on the substrate when light is reflected and/or transmitted by surfaces of the substrate and coating or coatings. The coatings can be deposited on essentially plane parallel or curved major surface of the substrate or on any plane parallel surface that is subsequently bent by any method known to those skilled in the art. Preferably, the single thin film coating layer is less than 1 micron in thickness on the substrate or on a previously coated substrate.

The MSVD, CVD, spray pyrolysis and/or sol-gel techniques are useful for applying the coating or coatings to the substrates to exhibit the desired interference effect, but the MSVD process is a preferred process. The MSVD process permits control of coating thickness, pattern formation and coating composition. Where the coating exhibiting interference effects includes a metal oxide coating, metal nitride coating or combination thereof, the coating may be obtained using the MSVD process by sputtering a metallic cathode in a non-reactive atmosphere, e.g. argon, to provide a metallic coating on the substrate, and thereafter heating the substrate in an oxidizing and/or nitriding atmosphere to provide the metal oxide coating, metal nitride coating or combinations thereof on the substrate. Where this method of forming a coating is employed, and where the surface is to be masked as described below with masking agent, the heating step may be performed before or after the masking step or steps. Alternatively, the coating exhibiting interference effects may be deposited directly as an oxide, nitride or mixture thereof by reactively sputtering a metallic cathode or combination of metallic cathodes in an atmosphere selected from the group consisting of oxidizing atmospheres, nitriding atmospheres and combinations thereof. Metal, metal oxide, metal nitride, and/or metal oxynitride targets may also be sputtered in inert atmospheres, e.g. oxygen, or atmospheres including an inert gas, e.g. argon combined with a reactive gas, e.g., nitrogen and/or oxygen. Also it is possible in an alternative sense to deposit a metallic coating with subsequent oxidation or nitriding. Such metals are titanium, cobalt, nickel, zirconium, tantalum, niobium and chromium and any of the previously mentioned metals and mixed metals thereof.

The interference effect itself, and in turn its visually observable result, (e.g. reflected or transmitted color) may be modified for an individual coating, among other ways: by varying the thickness of the coating as described above; and/or varying the components of the coating composition (e.g. modifying one or more components of the coating to be highly absorbing in one portion of the visible spectrum may alter the reflected or transmitted color). The patterned appearance of the article of the present invention may be modified, among other ways, by modifying the observed interference effects of an individual coating as described above, and/or varying the combination of the coatings deposited over substrate; and/or varying the substrate (e.g. a transparent glass substrate will provide a different reflected interference effect than an opaque metallic substrate).

Providing coatings of varying thicknesses may be accomplished by several methods. In one embodiment, the deposition technique itself (e.g. including but not limited to MSVD, CVD, spray pyrolysis, or sol-gel) may be directed or controlled so as to provide coatings having differential thickness over the surface of the substrate (or coatings previously deposited thereon) in a pattern form. This may be accomplished as for example by directing the spray pattern toward the surface of the substrate in a spray pattern that provides coatings of varying thickness in the pattern form desired.

In an alternative embodiment, the coating may be deposited uniformly over the surface of the substrate (or coatings previously deposited thereon), and subsequently milled or etched in a pattern form to varying thickness. The milling may include abrasively removing a portion of the coating or ion milling. The etching may be chemical, as by etching the surface of the coating with an etching solution.

In yet another embodiment of the present invention, a masking agent may be used to provide coatings of varying thickness. The mask may be in any form, including but not limited to a masking solution, gel, paste, powder, tape, metal or film. The coating may then be deposited uniformly or non-uniformly over the masked and unmasked portions of the surface of the substrate. Silk screening or printing methods like ink jet printing, off-set printing, or the application of removable stickers can be used. Subsequently, the masked portions, along with coating deposited thereon, is removed to provide coating or combinations of coatings of varying thickness. Where the method of forming the coating includes oxidizing and/or nitriding operations as described above, such operations may be performed either before or after the masking operation or operations to obtain the desired article having a patterned appearance.

Additionally the present invention can include a sequence of coating steps such as vacuum deposition techniques in conjunction with laser patterning of the deposited layer(s). The masking normally required to achieve controlled deposition of the colored film layers during vacuum deposition is replaced by laser patterning to remove the film from the areas where it is not desired after the film has been deposited. This combination of thin film coating and laser ablation involves a sequence of steps, i.e., film deposition followed by laser patterning. This sequence can be repeated any number of desired times the final pattern appearance. Any suitable laser known to those skilled in the art as useful with metal, metal oxide, and/or metal nitride thin film coatings can be used.

In an alternative embodiment of the present invention for multiple thin film coating layers of the metal-containing and/or semiconducting coatings, interlayer coatings or layers can be used between any one or more of the multiple thin film layers. Suitable interlayer coatings are those of dielectric materials, inorganic or organic non-absorbing materials. Nonexclusive examples are: metal oxides such as titanium dioxide, niobium pentaoxide ($Nb_2O_5$), tin oxide, zinc oxide, indium oxide (optionally doped with tin oxide), bismuth oxide, zirconium oxide and the like materials known to those skilled in the art. Yet another suitable material is silicon nitride. Other suitable dielectric material comprises a thin composite film containing zirconium nitride and silicon nitride (collectively referred to as 'SiZrN') that is fabricated by cosputtering from dual targets or from a single alloy target of a direct current cylindrical magnetron. Others include dielectric materials formed of a suitable dielectric having a low index of refraction as, for example, magnesium fluoride. Other interlayer materials can be inorganic and organic nonabsorbing coatings. Also useful interlayer materials are organic nonabsorbing coatings such as polyester film, polyvinylpyrrolidone film, and poly(vinylbutyrate) film In addition to the use of intercoatings or interlayers, the article of the present invention can be a component in a laminate structure. One or more articles with the patterned appearance are sealed with or without other unpatterned substrates and/or interlayers into the laminate. Any process known to those skilled in the art of making laminates of glass or other aforementioned substrates can be used.

The invention is further illustrated by the following non-limiting examples.

EXAMPLE 1

A substrate comprising a piece of clear float glass measuring about 12 inches wide by about 12 inches long by about 6 millimeters thick was coated with a titanium metal coating as follows. The substrate was placed in an MSVD chamber and positioned beneath a titanium cathode on a conveying device in preparation for the deposition of a titanium metal coating thereon. The cathode was energized to a power of about 3.4 kilowatts. The substrate was passed under the cathode for 3 passes to provide a titanium metal coating on a surface of the substrate.

The substrate was then be removed from the MSVD apparatus and a portion of the surface of the article so coated was provided with a mask in a pattern in the form of printed text.

The substrate was again placed in the MSVD coating chamber and both the masked and unmasked portions of the substrate were overcoated with additional titanium metal by energizing the cathode to about 3.4 kilowatts and passing the substrate under cathode for 2 additional passes, for a total of 5 passes.

The substrate was removed from the MSVD chamber and the mask was removed along with the titanium metal deposited over the mask.

The substrate was then inserted into a furnace maintained at a temperature of about 1200° F. having an ambient atmosphere for about 7 minutes to oxidize the titanium metal coatings to a titanium dioxide coatings. The portion of the coating that had previously been masked upon oxidation had a thickness of about 770 Angstroms and appeared to have a gold color under reflected white diffused light provided by a GE Trimline T8 500K fluorescent bulb. The portion of the coating that had not been previously masked upon oxidation had a thickness of about 1258 Angstroms and appeared to have a blue color under reflected white diffused light provided by a GE Trimline T8 500K fluorescent bulb.

The article thus prepared was visually observed to have gold textual letters on what was observed to be a blue background when the coated surface of the substrate was viewed under reflected white diffused light provided by a GE Trimline T8 500K fluorescent bulb.

EXAMPLE 2

A substrate comprising a piece of clear float glass measuring about 12 inches wide by about 12 inches long by about 6 millimeters thick was coated with titanium metal and masked as described in Example 1, except that the process was repeated to provide several coatings and masks on the surface. Upon removal of the masks and oxidation of the substrate, the substrate was observed to have several patterns of varying reflected colors.

More particularly, a first titanium metal coating was provided over the substrate by passing the substrate under the cathode described in Example 1. The substrate was passed twice under the cathode.

The substrate was removed from the MSVD chamber, and a portion of the first titanium metal coating was provided with a first mask in a pattern in the form of printed text. This mask was applied, as were all subsequent masks, as an adhesive sticker. The substrate was again placed in the MSVD coating chamber and both the masked and unmasked portions of the substrate were overcoated with a second titanium metal coating by energizing the cathode to about 3.4 kilowatts and passing the substrate under cathode for an additional pass, for a total of 3 passes.

The substrate was again removed from the MSVD chamber, and a portion of the second titanium metal coating was provided with a second mask also in the form of printed text, which second mask was positioned over an area of the substrate other than that occupied by the first mask.

The substrate was again placed in the MSVD coating chamber and both the masked and unmasked portions of the substrate were overcoated with a third titanium metal coating by energizing the cathode to about 3.4 kilowatts and passing the substrate under cathode for an additional pass, for a total of 4 passes.

The substrate was again removed from the MSVD chamber, and a portion of the third titanium metal coating was provided with a third mask thereover in the form of printed text, which third mask was positioned over an area of the substrate other than that occupied by either the first or second masks.

The substrate was again placed in the MSVD coating chamber and both the masked and unmasked portions of the substrate were overcoated with a fourth titanium metal coating by energizing the cathode to about 3.4, kilowatts and passing the substrate under cathode for an additional pass, for a total of 5 passes.

The substrate was removed from the MSVD chamber and the first, second and third masks were removed along with the titanium metal deposited over each respective mask by pulling the respective adhesive stickers from the substrate.

The substrate was then inserted into a furnace maintained at a temperature of about 1200° F. having an ambient atmosphere for about 7 minutes to oxidize the titanium metal coatings to a titanium dioxide coatings.

The portion of the coating that had previously been masked with the first mask, upon oxidation had a thickness of about 515 Angstroms and appeared to have a silver color under reflected white diffused light provided by a GE Trimline T8 500K fluorescent bulb. The portion of the coating that had previously been masked with the second mask upon oxidation had a thickness of about 770 Angstroms and appeared to have a gold color under reflected white diffused light provided by a GE Trimline T8 500K fluorescent bulb. The portion of the coating that had previously been masked with the third mask upon oxidation had a thickness of about 1028 Angstroms and appeared to have a fuchsia color under reflected white diffused light provided by a GE Trimline T8 500K fluorescent bulb. The portion of the coating that had not been masked, corresponding to the fourth titanium metal coating, upon oxidation upon oxidation had a thickness of about 1258 Angstroms and appeared to have a blue color under reflected white diffused light provided by a GE Trimline T8 500K fluorescent bulb.

The article thus prepared was visually observed to have an area of silver printed text, a separate area of gold printed text and a still separate area of fuchsia printed text on what was observed to be a blue background when the coated surface of the substrate was viewed under reflected white diffused light provided by a GE Trimline T8 500K fluorescent bulb.

EXAMPLE 3

A substrate comprising a piece of clear float glass measuring about 12 inches wide by about 12 inches long by about 6 millimeters thick may be provided with a mask in a pattern form. The mask may be formed over the glass substrate by applying a masking solution over the surface of the substrate by dipping a desired pattern form in the masking solution and pressing the pattern form to the surface of the substrate and removing the pattern form from the surface of the substrate. The pattern form may be made of any absorbent material, including a pad or a sponge. The masking solution remaining on the surface of the substrate is allowed to dry to form a mask in a pattern form on the surface of the glass substrate.

The substrate may then be placed in an MSVD chamber and positioned beneath a titanium cathode on a conveying device in preparation for the deposition of a titanium metal coating thereon. The MSVD cathode target may measure about 5 inches by about 17 inches. The target may be sputtered to provide a titanium metal coating over the entire surface of the substrate, including both the masked and unmasked portions thereof. The MSVD sputtering chamber may be evacuated to a pressure of about $10^{-6}$ torr and backfilled with argon gas to a pressure of about 4 microns, whereupon the cathode may be energized to a power of about 3 kilowatts at about 370 volts. The substrate may be passed under the cathode for 4 passes at rate of about 120 inches per minute to provide about a 529 Angstrom thick titanium metal coating on a surface of the substrate. The substrate may then be removed from the MSVD apparatus.

The mask may then be removed from the substrate by wiping the surface of the substrate with a solvent which dissolves the mask, to provide a first portion of the substrate corresponding to the shape of the pattern form which is not coated surrounded by second portion of the surface over which titanium metal coating has been deposited.

The substrate may then be inserted into a furnace having an ambient atmosphere which is maintained at a temperature of about 1300° F. for about 3.5 minutes to oxidize the titanium metal to a titanium dioxide coating having a thickness of about 950 Angstroms.

Upon oxidation of the titanium to titanium dioxide an article having a visually observable patterned appearance will be formed.

When viewed under reflected "white" visible light from a GE Trimline T8 500K fluorescent bulb, the uncoated portion of the substrate will appear as a neutrally colored float glass surface with approximately 8% visible reflectance. Under the same reflected light the titanium dioxide coated portion of the substrate will appear as a reddish bronze coating with approximately 21% visible reflectance exhibiting CIE Chromaticity 1931 2° Observer Coordinates of about x=0.385 and y=0.344, due to the interference effect produced by the titanium dioxide coating present over the surface of the substrate.

When viewed under transmitted "white" visible light provided by a GE Trimline T8 500K fluorescent bulb, uncoated portions will again appear as neutral float glass, while the titanium dioxide coated portion will appear to have a blue color, due to the interference effect produced by the titanium dioxide coating present over the surface of the substrate.

EXAMPLE 4

A article having a visually patterned appearance may be prepared according to Example 3 except that the entire substrate of the substrate may be coated with the titanium metal coating having a thickness of about 529 Angstroms prior to masking. The titanium coated, unmasked substrate may be heated to oxidize the titanium metal to titanium dioxide to form a first titanium dioxide coating having a thickness of about 950 Angstroms on the surface of the substrate, as described in Example 3.

The first titanium dioxide coating may then be masked as in the same manner as described in Example 3 to provide a pattern form on a surface of the glass substrate, as set forth in Example 3.

The substrate may then be coated with a second coating of titanium metal by inserting the masked/titanium dioxide coated substrate into the MSVD chamber and subjecting it to two more passes under the titanium metal cathode or provide a titanium metal coating over the substrate about 774 Angstroms thick.

The mask may be removed as described in Example 3 to expose the first titanium dioxide coating.

The substrate may then be heated in the furnace to oxidize the second titanium metal coating to titanium dioxide, to form a titanium dioxide coating which is about 1390 Angstroms thick over that portion of the surface of the substrate which had not been masked. Those portions of the surface of the substrate which had been masked will have the about 950 Angstroms thick titanium dioxide coating thereover.

As may be appreciated, prior to the oxidation of the second titanium metal coating, an article having a visually observable patterned appearance will be formed consisting of the mask-removed portion of the surface of the substrate which will have exposed the first titanium dioxide coating, which is in contrast to the second titanium metal coating.

Upon oxidation of the second titanium metal coating to titanium dioxide, that portion of the titanium dioxide coating over the surface of the substrate which is about 950 Angstroms thick will appear under reflected light from a GE Trimline T8 500K fluorescent bulb as a reddish bronze coating with approximately 21% visible reflectance exhibiting CIE Chromaticity 1931 2° Observer Coordinates of about x=0.385 and y=0.344, due to the interference effect produced by the titanium dioxide coating present over the surface of the substrate. When viewed under transmitted "white" visible light provided by the GE Trimline T8 500K fluorescent bulb, the 950 Angstrom thick titanium dioxide coated portion of the surface of the substrate will appear to have a blue color, due to the interference effect produced by the 950 Angstrom thick titanium dioxide coating present over the surface of the substrate.

Also upon oxidation of the second titanium metal coating to titanium dioxide, that portion of the titanium dioxide coating over the surface of the substrate which is about 1390 Angstroms thick will appear under reflected light from a GE Trimline T8 500K fluorescent bulb blue in color with approximately 24% visible reflectance exhibiting CIE Chromaticity 1931 2° Observer Coordinates of about x=0.227 and y=0.290, due to the interference effect produced by the about 1390 Angstrom thick titanium dioxide coating present over the surface of the substrate. When viewed under transmitted "white" visible light provided by the GE Trimline T8 500K fluorescent bulb, the 1390 Angstrom thick titanium dioxide coated portion of the surface of the substrate will appear to have an orange color, due to the interference effect produced by the about 1390 Angstrom thick titanium dioxide coating present over the surface of the substrate.

The above examples are offered to illustrate the present invention and are not intended to limit the invention. Various modifications are included within the scope of the invention, which is defined by the following claims.

We claim:

1. A method for providing an article having a visually patterned appearance comprising the steps of:

a. providing a substrate that has at least one major surface that reflects visible light, or the substrate transmits visible light, or the at least one major surface reflects visible light and the substrate transmits visible light;

b. providing at least one mask over a portion of the at least one major surface of the substrate, the mask having a pattern form to provide a masked portion of the at least one major surface of the substrate and an unmasked portion of the at least one major surface of the substrate;

c. providing at least one transparent coating selected from the group of metal-containing coatings and semi-conductor-containing coatings over at least the unmasked portion of the at least one major surface of the substrate, comprising:

(i) depositing at least one coating by magnetron sputter vacuum deposition, chemical vapor deposition, spray pyrolysis process or sol-gel applications over at least the unmasked portion of the at least one major surface of the substrate, wherein the at least one coating is selected from the group of metal oxide coatings, metal nitride coatings, semi-conductor-containing coatings and metal-containing coatings and mixtures thereof; and optionally (ii) heating the at least one coating, the at least one transparent coating having a thickness in the range of fractions of visible light wavelengths to provide at least one interference color when visible light is reflected from the coated unmasked portion of the at least one major surface of the substrate and/or is transmitted through the coated unmasked portion of the at least one major surface of the substrate and the substrate; and d. removing the mask to expose uncoated portion of the at least one major surface of the substrate under the mask;

wherein color of visible light reflected from the coated unmasked portion of the at least one major surface of the substrate and/or transmitted through the coated unmasked portion of the at least one major surface of the substrate and the substrate is different from color of visible light reflected from the uncoated portion of the at least one major surface of the substrate and/or transmitted through the uncoated portion of the at least one major surface of the substrate and the substrate, respectively, to provide the article having a visually patterned appearance.

2. Method of claim 1 which includes repeating steps b, c, and d to provide multiple patterns.

3. Method of claim 1 wherein the at least one transparent coating is provided by:

i) depositing at least one metal-containing coatings; and ii) heating the coated substrate in an oxidizing or nitriding atmosphere or combinations thereof to provide a metal oxide coating or metal nitride coating or combinations thereof on the substrate to provide the visually patterned appearance.

4. Method of claim 3 wherein the at least one coating is a metal-containing coating that is selected from the group of: titanium, tin, zinc stannate, zinc, zirconium, nickel-chromium, and any mixtures thereof.

5. Method of claim 1 which includes repeating steps b, c, and d wherein for the repetition of step c, the at least one transparent coating provided is the deposition of at least one metal-containing coating; and includes:

heating the substrate in an oxidizing atmosphere or nitriding atmosphere or combinations thereof to provide the metal oxide coating or metal nitride coating or combinations thereof on the at least one major surface of the substrate to form the patterned appearance.

6. Method of claim 3 wherein step c) is repeated after which the coated substrate is heated in an oxidizing or nitriding atmosphere or combinations thereof to provide the metal oxide coating or metal nitride coating or combinations thereof on the substrate to provide the visually patterned appearance.

7. Method of claim 3, wherein steps i) and ii) are repeated to provide multiple visually patterned appearances.

8. A method of providing an article having a visually patterned appearance comprising the steps of:

a. providing a substrate having at least one major surface;

b. depositing a first thin film metal coating over the at least one major surface of the substrate;

c. positioning at least one mask over a portion of the coated at least one major surface of the substrate, the mask having a pattern form to provide a masked portion of the coated at least one major surface of the substrate and an unmasked portion of the coated at least one major surface of the substrate;

d. depositing a second thin film metal coating over at least the unmasked coated portion of the at least one major surface of the substrate;

e. removing the mask to expose the uncoated first thin film coating; and f. heating the coated substrate in an oxidizing atmosphere or nitriding atmosphere or combinations thereof to provide a first transparent coating over the at least one major portion of the substrate, the first transparent coating comprising a metal oxide coating or metal nitride coating or combinations thereof, and a second transparent coating over at least the unmasked coated portion of the at least one major surface of the substrate, the second transparent coating comprising a metal oxide coating or metal nitride coating or combinations thereof wherein the first transparent coating has a thickness in the range of fractions of visible light wavelenqths to generate at least one interference color defined as a first interference color when visible light is reflected from the coated at least one major surface of the substrate and/or is transmitted through the coated at least one major surface of the substrate and the substrate, and the second transparent coating has a thickness in the range of fractions of visible light wavelengths to generate at least one interference color defined as a second interference color when visible light is reflected from the coated unmasked coated portion of the at least one surface and/or is transmitted through the coated unmasked coated portion of the at least one major surface of the substrate and the substrate, and wherein the first interference color is different from the second interference color to provide a visually patterned appearance to said article.

9. Method of claim 8 which includes repeating steps c, d, and e prior to step f to provide multiple images.

10. A method of providing an article having a visually patterned appearance comprising the steps of:

a. providing a substrate having at least one major surface;

b. depositing at least one thin film transparent coating of a predetermined thickness, the coating exhibiting a reflected color or a transmitted color uniformly over the surface of the substrate to provide a first portion of the surface of the substrate; and c. removing portions of the coating to provide one or more areas of coating thickness less than the predetermined thickness wherein visible light reflected from the coating having a predetermined thickness and/or transmitted through the coating having a predetermined thickness and the substrate has an interference color different from visible light reflected from the areas of the coating having a thickness less than the predetermined thickness and/or transmitted through the areas of coating having thickness less than the predetermined thickness and the substrate to provide a visually patterned appearance to said article, wherein the removing is conducted by a process selected from the group of: laser ablation, ion milling, and chemical etching.

11. Method for providing an article having a visually patterned appearance comprising the steps of;

providing a substrate, the substrate having a major surface, and applying a thin film layer to selected portions of the major surface of the substrate, heating the coated substrate in an oxidizing atmosphere or nitriding atmosphere or combinations thereof to provide a thin transparent film layer comprising a metal oxide coating or a metal nitride coating or a combinations thereof on the substrate, the thin transparent film layer having a thickness in the range of fractions of visible light wavelengths wherein at least one interference color defined as a first interference color is observed when visible tight is reflected from the coated portion of the surface of the substrate and/or is transmitted through the coated portion of the surface of the substrate and through the substrate and at least one interference color defined as a second interference color when visible light is reflected from the uncoated portion of the major surface of the substrate and/or transmitted through the uncoated portion of the major surface of the substrate and the substrate wherein the first interference color is different from the second interference color, to provide the article having a visually patterned appearance.

12. Method of claim 11 wherein the selected portions are first selected portions and further including repeating the applying step to coat second selected portions of the major surface of the substrate wherein the second selected portions of the major surface include the first selected portions.

* * * * *